US007804795B2

(12) United States Patent
Do et al.

(10) Patent No.: US 7,804,795 B2
(45) Date of Patent: Sep. 28, 2010

(54) METHOD OF CONFIGURING AND REGISTERING INTERNET PROTOCOL ADDRESS IN A WIRELESS MOBILE COMMUNICATION SYSTEM HAVING CONNECTION-ORIENTED RADIO LINK

(75) Inventors: Mi-Sun Do, Suwon-si (KR); Youn-Hee Han, Guri-si (KR); Hee-Jin Jang, Yongin-si (KR); Jong-Ho Bang, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 529 days.

(21) Appl. No.: 11/582,476

(22) Filed: Oct. 18, 2006

(65) Prior Publication Data

US 2007/0091822 A1    Apr. 26, 2007

(30) Foreign Application Priority Data

Oct. 21, 2005   (KR)  ............. 10-2005-0099739

(51) Int. Cl.
*H04W 4/00* (2009.01)
(52) U.S. Cl. .......... 370/313; 370/310.1; 370/312; 370/329; 370/352; 370/401; 455/435.1; 455/466
(58) Field of Classification Search ........... 370/254, 370/310.1, 312, 313, 320, 328, 329, 331, 370/338, 349, 352, 400, 436, 475, 401; 709/204, 709/222; 455/435.1, 466
See application file for complete search history.

(56) References Cited

U.S. PATENT DOCUMENTS

| | | | |
|---|---|---|---|
| 6,300,887 B1 * | 10/2001 | Le | 341/60 |
| 6,847,621 B1 * | 1/2005 | Asahina | 370/331 |
| 6,862,276 B1 * | 3/2005 | Abrol et al. | 370/349 |
| 7,035,236 B2 * | 4/2006 | Agrawal et al. | 370/331 |
| 7,061,880 B2 * | 6/2006 | Basilier | 370/312 |
| 7,193,977 B2 * | 3/2007 | Lim | 370/313 |
| 7,218,952 B1 * | 5/2007 | Alperovich et al. | 455/552.1 |
| 7,359,372 B2 * | 4/2008 | Pelletier et al. | 370/352 |
| 7,376,128 B2 * | 5/2008 | Chen et al. | 370/352 |
| 7,430,602 B2 * | 9/2008 | Babbar et al. | 709/227 |
| 7,493,363 B2 * | 2/2009 | Huitema et al. | 709/204 |

(Continued)

FOREIGN PATENT DOCUMENTS

KR    10-2004-0107585 A    12/2004

OTHER PUBLICATIONS

"IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", Sep. 2005, IEEE, IEEE P802.16e/D11, pp. 21, 43-49, 625-629.*

*Primary Examiner*—Sharad Rampuria
(74) *Attorney, Agent, or Firm*—NSIP Law (57) ABSTRACT

A method of configuring and registering an Internet Protocol (IPv6) address in a wireless mobile communication system having a connection-oriented radio link is provided. In an IP configuration method without Duplicate Address Detection (DAD), a Mobile Station (MS) is allocated a unique Connection Identifier (CID) specific to the MS from a serving Base Station (BS), and the MS and BS configure the IPv6 address independently using a known network prefix, a Medium Access Control (MAC) address of the MS, and the allocated CID. The BS registers the configured IPv6 address to a HA on behalf of MS.

16 Claims, 5 Drawing Sheets

U.S. PATENT DOCUMENTS

| | | | |
|---|---|---|---|
| 7,539,502 B2* | 5/2009 | Lovell, Jr. | 455/466 |
| 7,610,363 B2* | 10/2009 | Kim et al. | 709/220 |
| 7,680,123 B2* | 3/2010 | Veerepalli | 370/395.3 |
| 7,697,930 B2* | 4/2010 | Miao et al. | 455/432.1 |
| 2003/0142650 A1* | 7/2003 | Fan | 370/338 |
| 2004/0034708 A1* | 2/2004 | Pelletier et al. | 709/227 |
| 2005/0265360 A1* | 12/2005 | Kim et al. | 370/400 |
| 2005/0271034 A1* | 12/2005 | Asokan et al. | 370/349 |
| 2008/0031189 A1* | 2/2008 | Choi et al. | 370/329 |
| 2008/0043665 A1* | 2/2008 | Jeon et al. | 370/328 |

* cited by examiner

METHOD OF CONFIGURING AND REGISTERING INTERNET PROTOCOL ADDRESS IN A WIRELESS MOBILE COMMUNICATION SYSTEM HAVING CONNECTION-ORIENTED RADIO LINK

CROSS-REFERENCE TO RELATED APPLICATIONS

This application claims priority under 35 U.S.C. §119(a) of Korean Patent Application No. 2005-99739, filed Oct. 21, 2005 in the Korean Intellectual Property Office, the entire disclosure of which is hereby incorporated by reference.

BACKGROUND OF THE INVENTION

1. Field of the Invention

The present invention relates generally to a wireless mobile communication system having a connection-oriented radio link. More particularly the present invention relates to a method of configuring and registering an Internet Protocol (IP) address in a wireless mobile communication system.

2. Description of the Related Art

Provisioning of services with various Quality of Service (QoS) levels at about 100 Mbps to users is an active study area for a future-generation communication system called a 4th Generation (4G) communication system. The Institute of Electrical and Electronics Engineers (IEEE) 802.16e is a major 4G communication system.

The IEEE 802.16e communication system is designed to interwork with a new future-generation Internet address system, Internet Protocol version 6 (IPv6), for the purpose of providing services to users over IP.

IPv6 is an address system enhanced from IPv4. The IPv4 system has problems in address resources, mobility, and security due to the drastic increasing use of the Internet since the 1990's. IPv6 is defined in Internet Engineering Task Force (IETF) Request For Comments (RFC) 2460. IPv6 advantageously solves the problem of shortage of IP addresses because an IP address is extended from 32 bits to 128 bits. Also, IPv6 processes multimedia data in real time with reinforced security.

Nonetheless, IPv6 suffers from time delay involved in Duplicate Address Detection (DAD) for a Mobile Station (MS). In this context, IETF specifications associated with IPv6 will be described below.

IETF RFC 2462 "IPv6 Stateless Address Auto-configuration" provides that an MS shall perform an IP address auto-configuration procedure to establish an IP connection with a Base Station (BS).

For this purpose, the MS configures a 128-bit IP address using a 64-bit network prefix and a 64-bit extended unique identifier address.

The MS then performs DAD to determine whether the configured IP address is in use for another MS within the same subnet. Until completing the DAD process, the MS is not allowed to send or receive data to or from the BS.

IETF RFC 3775 "Mobility Support in IPv6" also regulates that the MS shall perform the DAD after completing the IP address configuration, thus prohibiting data transmission/reception to/from the BS for a predetermined time.

Accordingly, there is a need for an improved method of configuring and registering an IP address in a wireless communication system having a connection-oriented radio link.

SUMMARY OF THE INVENTION

Exemplary embodiments of the present invention address at least the above problems and/or disadvantages and provide at least the advantages described below. Accordingly, an aspect of the present invention is to provide a method of configuring and registering an IP address without the need for DAD in a wireless mobile communication system having a connection-oriented radio link.

According to one exemplary aspect of the present invention, in a method of configuring an IP address in an MS in a wireless mobile communication system having a connection-oriented radio link, the MS is allocated a CID specific to the MS from a serving BS, and configures the IP address using a known network prefix, a MAC address of the MS, and the allocated CID.

According to another exemplary aspect of the present invention, in a method of receiving an HoA in an MS in a wireless mobile communication system having a connection-oriented radio link, the MS sends a message including an indicator indicating whether the MS has an HoA to a serving BS selected for initial network entry, and receives the HoA from the serving BS, if the indication indicates that the MS has no HoA.

According to a further exemplary aspect of the present invention, in a method of configuring an IP address without DAD during handover in an MS in a wireless mobile communication system having a connection-oriented radio link, the MS decides on a handover from an old serving BS to a target BS, sends a ranging request message including a MAC address of the MS and information indicating the handover to the target BS, is allocated a CID specific to the MS from the target BS, and configures the IP using a network prefix known from a routing advertisement message received from the target BS, the MAC address of the MS, and the allocated CID.

According to still another exemplary aspect of the present invention, in a method of configuring an IP address without DAD in a serving BS in a wireless mobile communication system having a connection-oriented radio link, the serving BS receives a MAC address of an MS from the MS, and configures the IP address using a known prefix, the MAC address, and a CID allocated to the MS.

According to yet another exemplary aspect of the present invention, in a method of configuring an IP address without DAD in a wireless mobile communication system having a connection-oriented radio link, an MS sends its MAC address to a serving BS. The serving BS configures the IP address using a known prefix, the MAC address, and a CID allocated to the MS. Upon receipt of the network prefix, the MS configures the IP address using the network prefix, the MAC address, and the CID.

BRIEF DESCRIPTION OF THE DRAWINGS

The above and other objects, features and advantages of exemplary embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The exemplary embodiments are intended to provide an IP configuration and registration method in a wireless mobile communication system having a connection-oriented radio link, for configuring an IPv6 address using a unique link identifier (ID) specific to each MS in an MS and a BS, thereby obviating the need for DAD.

An exemplary embodiment of the present invention is characterized in that an MS configures and registers an IP address without DAD during initial network entry. Another exemplary embodiment of the present invention is characterized in that the MS configures and registers an IP address without DAD during inter-subnet handover.

Before describing exemplary embodiments of the present invention, it is made clear that a wireless mobile communication system having a connection-oriented radio link allocates a unique link ID to each MS and conducts communications for the MS using the unique link ID in order to distinguish a plurality of MSs accessing the same radio link and their transmission data from one another.

To be more specific, when the MS initially accesses a network, it sends its Medium Access Control (MAC) address to a BS and the BS allocates a unique link ID to the MS. The MS requests a service using the unique link ID and the BS establishes a connection with the MS, for transmission/reception of data and control information.

Data transmission/reception using the unique link ID, in other words a unique Connection ID (CID) between the MS and the BS is called connection-oriented communication. In IEEE 802.16, a basic CID, a primary management CID, and a secondary management CID are defined. Therefore, the present invention is applicable to any mobile communication system having a connection-oriented radio link, particularly an IEE 802.16e communication system, Wireless Broadband (WiBro), Worldwide interoperability for Microwave Access (WiMAX), and a future generation IP mobile communication system.

Exemplary embodiments of the present invention are descried below in the context of the IEEE 802.16e communication system intended for IP-based Broadband Wireless Access (BWA) communication applications.

Figure 1:
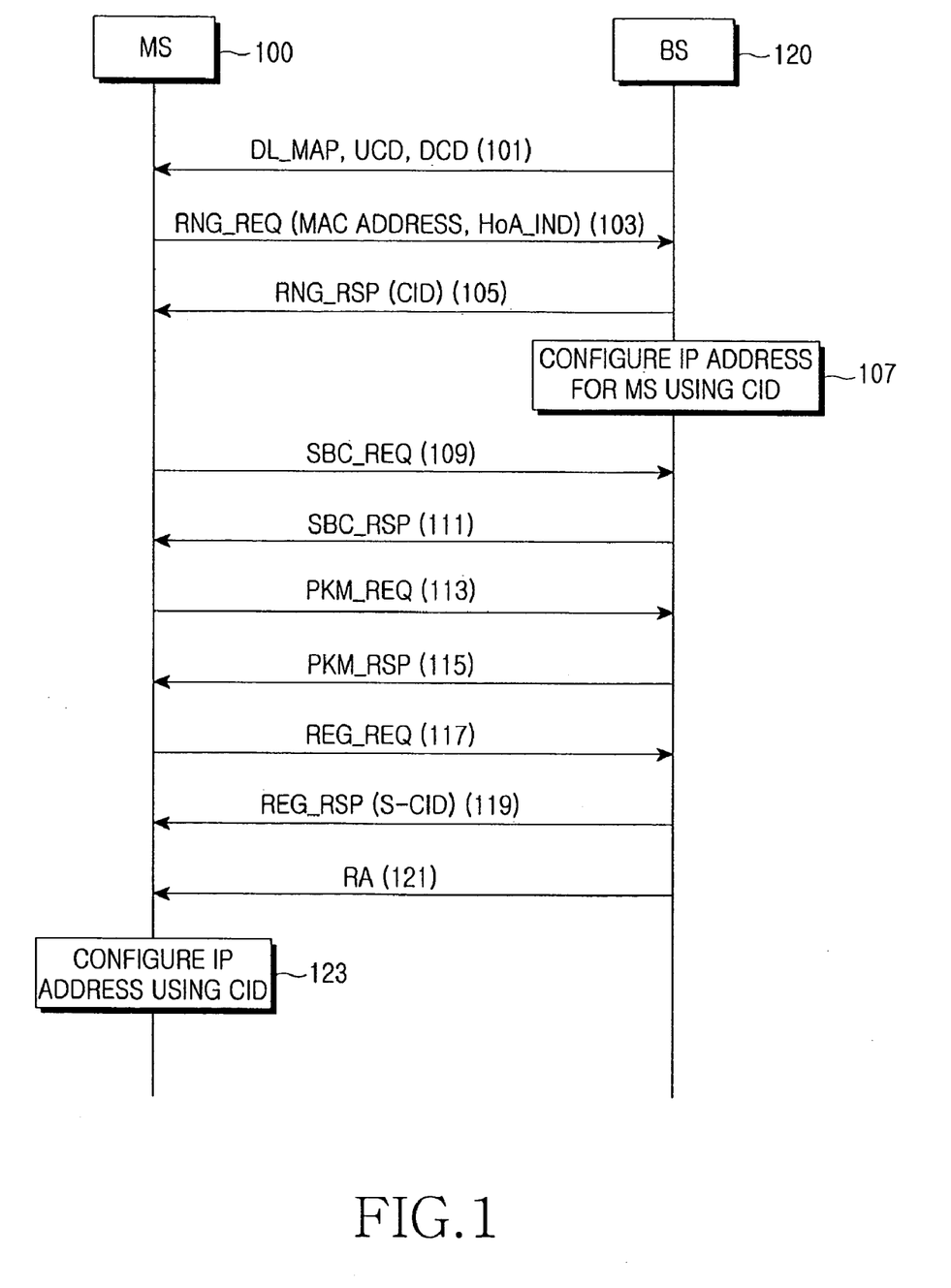
FIG. 1 is a diagram illustrating a signal flow for an IP address configuration operation during initial network entry of an MS in a wireless mobile communication system having a connection-oriented radio link according to an exemplary embodiment of the present invention.

FIG. 1 is a diagram illustrating a signal flow for an IP address configuration operation during initial network entry of an MS in a wireless mobile communication system having a connection-oriented radio link according to an exemplary embodiment of the present invention.

Referring to FIG. 1, an MS 100 periodically receives a Downlink Medium Access Protocol (DL_MAP) message, a Downlink Channel Descriptor (DCD) message, and an Uplink Channel Descriptor (UCD) message from a BS 120 in step 101.

For initial network entry, the MS 100 sends a RaNGing REQuest (RNG_REQ) message to the BS 120 in step 103. The RNG_REQ message contains the MAC address of the MS 100 and a Home of Address INDicator (HoA_IND) proposed according to exemplary embodiments of the present invention. If HoA_IND is set to 0, the BS 120 determines that the MS 100 has no HoA at present. If HoA_IND is set to 1, the BS 120 can obtain the HoA of the MS 100 acquired from a REGistration REQuest (REG_REQ) message received later. The HoA acquisition of the MS 100 will be described later in detail with reference to FIG. 2.

In step 105, the BS 120 replies to the RNG_REQ message with a RaNGing ReSPonse (RNG_RSP) message containing a CID to be allocated to the MS 100. The CID may be a basic CID or a primary management CID.

The BS 120 configures an IPv6 address for the MS 100 using the MAC address of the MS 100, the CID, and a known network prefix in step 107. Conventionally, only the MS 100 configures the IPv6 address and performs DAD to verify that the configured IP address is unique. Also, the IPv6 address is configured using a 64-bit network prefix and a link local address called by extended unique identifier (EUI) 64 address, i.e., a 48-bit MAC address and a 16-bit meaningless value (fffe) in the conventional technology. On the other hand, in exemplary embodiments of the present invention, the BS or the MS configures a 128-bit IP address using the MS-specific CID instead of the 16-bit meaningless value. Therefore, the configured IP address is unique to the MS, thereby obviating the need for DAD. The CID is 16 bits, satisfying backward compatibility with existing communication systems. Furthermore, since the IP address configuration takes places in the MS and the BS, independently, the BS can perform IP registration fast on behalf of the MS, i.e., as soon as the MS is authenticated as in step 115 later.

In 109, the MS 100 sends a Subscriber station Basic Capability REQuest (SBC_REQ) message to the BS 120. As the MS 100 receives a Subscriber station Basic Capability ReSPonse (SBC_RSP) message from the BS 100, the SBC procedure is completed in step 111.

In step 113, the MS 100 sends a Privacy Key Management REQuest (PKM_REQ) message to the BS 120. The MS receives a Privacy Key Management ReSPonse (PKM_RSP) message from the BS 120, thus completing authentication in step 115.

Meanwhile, the BS 120, which has received the PKM_REQ message, requests an authentication server to authenticate the MS 100. If the HoA_IND in the RNG_REQ message is 0, an authentication request message sent to the authentication server includes information requesting an HoA for the MS 100. If HoA_IND is 1, the BS 120 does not request the HoA of the MS by the authentication request message and acquires the HoA from the REG-REQ message which will be received later from the MS 100. The authentication server notifies the BS 120 of the HoA of the MS. After obtaining the HoA of the MS, BS 120 sends a Binding Update REQuest (BU-REQ) message to the HA on the behalf of the MS.

After the authentication procedure, the MS 100 sends the REG_REQ message to the BS 120 in step 117 and receives a Registration ReSPonse (REG_RSP) message containing the HoA from the BS 120 in step 119 if the HoA_IND field was set to 0 in step 103. While not shown, the IP address of the MS 100 is registered by a binding update procedure between the BS 120 and the HA. Meanwhile, if an SS mgmt support field is set to 1 in the REG_REQ message, the REG_RSP message may contain an IP mgmt mode field set to 1 and a Secondary CID (S-CID).

The BS 120 sends a Routing Advertisement (RA) message to the MS 100 in step 121. The RA message contains network prefix information and is sent to the MS 100 identified by the S-CID or the IP address. Upon receipt of the RA message, the MS 100 configures the IP address using the MAC address of the MS 100, the CID included in the RNG_RSP message, and the network prefix included in the RA message in the same manner as in the BS 120 in step 123.

Figure 2:
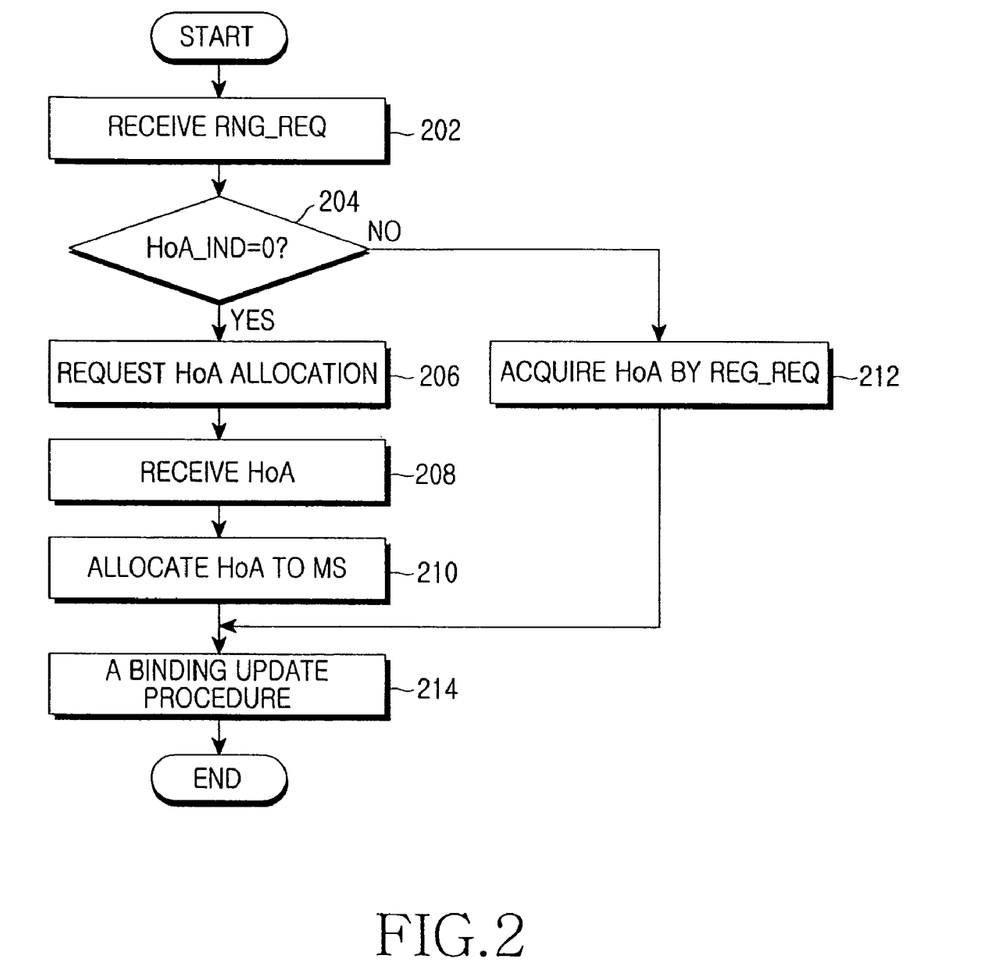
FIG. 2 is a flowchart illustrating how to get HoA address to register IP address of an MS in a BS in the wireless mobile communication system having a connection-oriented radio link according to an exemplary embodiment of the present invention.

FIG. 2 is a flowchart illustrating how to get HoA address to register IP address of an MS in the BS in the wireless mobile communication system having a connection-oriented radio link according to an exemplary embodiment of the present invention.

Referring to FIG. 2, the BS receives the RNG_REQ message indicating the initial network entry of the MS from the MS in step 202 and checks HoA_IND in the RNG_REQ message in step 204. If HoA_IND is 0, the BS goes to step 206 and if HoA_IND is 1, it proceeds to step 212.

If HoA_IND is 0, which implies that there is no HoA for the MS, the BS requests allocation of an HoA for the MS to the authentication server in step 206, receives the HoA from the authentication server in step 208, allocates the HoA to the MS in step 210, and completes the IPv6 address registration by sending BU-REQ message to HA and receiving Binding Acknowledgement (BA) message from the HA in step 214.

Meanwhile, the BS receives an REG_REQ message including the HoA from the MS in step 212, and then completes the IPv6 address registration by a binding update procedure in step 214.

Figure 3:
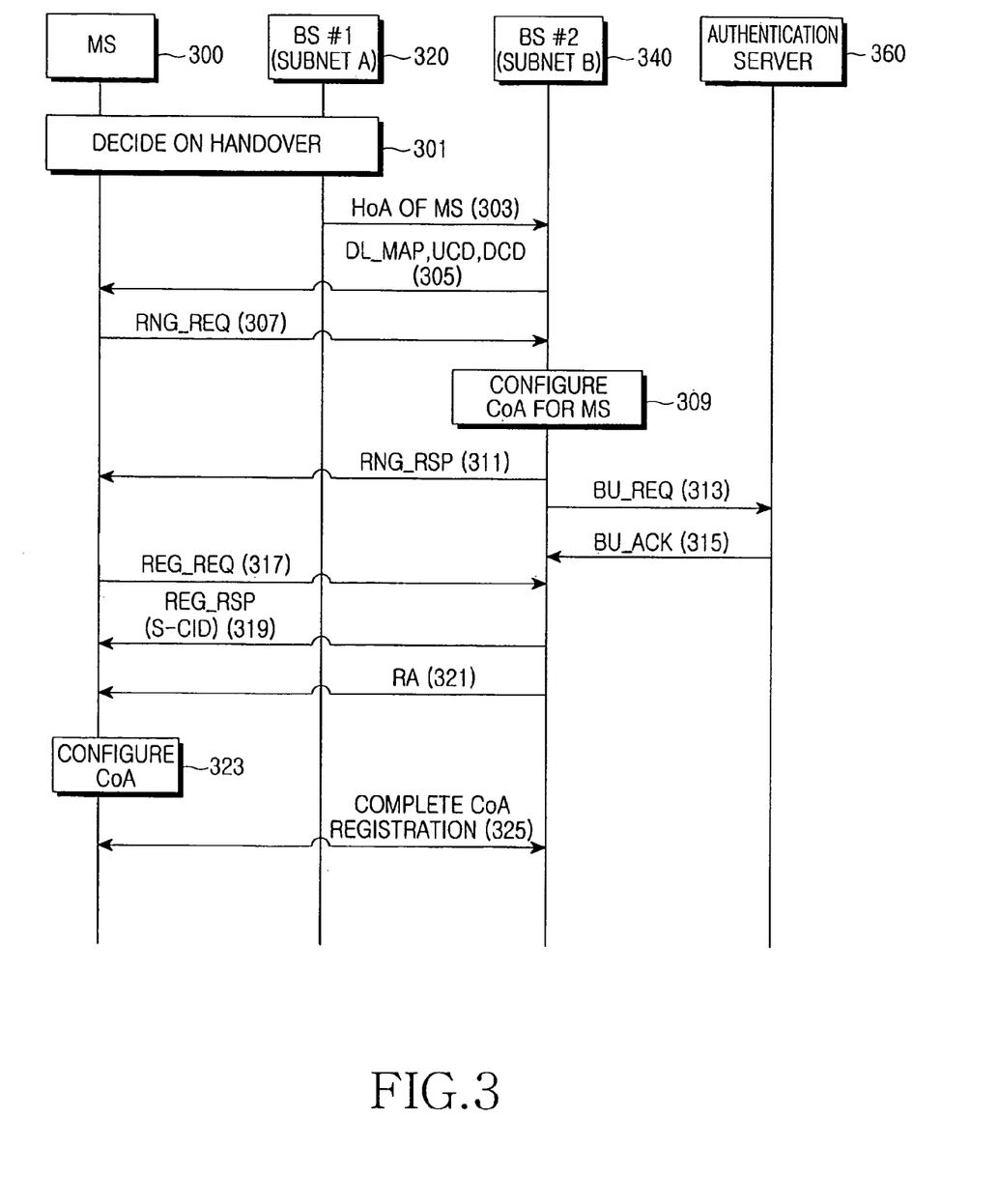
FIG. 3 is a diagram illustrating a signal flow for an IP address configuration and registration operation during handover of the MS in the wireless mobile communication system having a connection-oriented radio link according to another exemplary embodiment of the present invention.

FIG. 3 is a diagram illustrating a signal flow for an IP address configuration and registration operation during handover of the MS in the wireless mobile communication system having a connection-oriented radio link according to another exemplary embodiment of the present invention.

Referring to FIG. 3, when a handover is required for an MS 300, the MS 300 or a first BS 320 (BS #1) decides on the handover in step 301. If the received signal strength of the BS 320 is less than a threshold or that of a neighbor BS, in other words a second BS 340 (BS #2), the MS 300 may decide on the handover. Also, the BS 320 may decide on the handover for the MS 300 to distribute the BS's load. It is assumed herein that the MS 300 moves from the BS 320 in subnet A to the BS 340 in subnet B. For such an inter-subnet handover, the MS 300 must be allocated a new Care of Address (CoA) for use in the BS 340.

If the MS 300 decides on the handover for the above-mentioned reason, or if the BS 320 is notified of the handover, the BS 320 notifies the BS 340 of the HoA of the MS 300 in step 303 because the HoA is required for a binding update for the MS 300. The HoA transmission to the neighbor BS through a backbone reduces signaling load.

The BS 340 sends a DL_MAP, a UCD and a DCD to the MS 300 in step 305 and receives an RNG_REQ message from the MS 300 in step 307. The RNG_REQ message contains the MAC address of the MS 300 and an HoA indicator.

The BS 340 configures a CoA for the MS 300 using the MAC address, a CID to be allocated to the MS 300, and a network prefix in step 309 and sends an RNG_RSP message containing the CID to the MS 300 in step 311. It is to be noted that step 309 may take place after step 311.

After completing the CoA configuration, the BS 340 sends a embedded Binding Update REQuest (BU_REQ) message to an authentication server 360 to register the CoA in a HA (not shown) in step 313 and receives a Binding Update ACKnowledgement (BU_ACK) message as a response in step 315.

In step 317, the MS 300 sends an REG_REQ message to the BS 340. As the MS 300 receives an REG_RSP message from the BS 340, the registration procedure is completed in step 319. If SS mgmt. support is set to 1 in the REG_REQ message, IP mgmt. mode is set to 1 and an S-CID may be contained in the REG_RSP message. Needless to say, the MS registration procedure of steps 317 and 318 may precede the binding update procedure of steps 313 and 315. During the handover, the SBC_REQ-SBC_RSP and the PKM_REQ-PKM_RSP exchange procedures may not be performed according to the value of a Handover process optimization field in the RNG-RSP message. In this case, the related values may be delivered from BS#1 320 to BS #2 340 through backbone network.

In step 321, the BS 340 sends an RA message containing the network prefix to the MS 300. In step 323, the MS 300 configures the CoA using the network prefix, the MAC address of the MS 300, and the CID allocated in step 311.

Meanwhile, the BS 340 completes the CoA registration for the MS 300 after receiving the BU_ACK message from HA through the authentication server 360 in step 315. The BS may deliver the BU_ACK message to the MS in step 325

Figure 4:
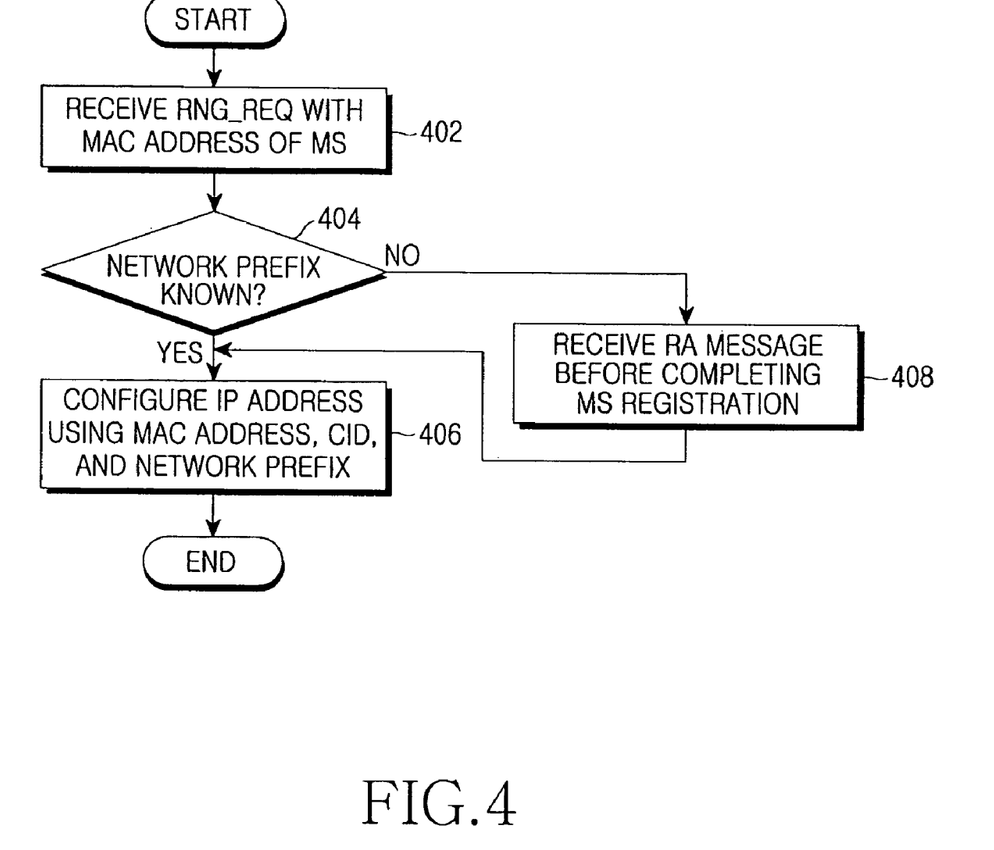
FIG. 4 is a flowchart illustrating an IP address configuration operation in the BS in the wireless mobile communication system having a connection-oriented radio link according to exemplary embodiments of the present invention.

FIG. 4 is a flowchart illustrating an IP address configuration operation in the BS in the wireless mobile communication system having a connection-oriented radio link according to exemplary embodiments of the present invention.

Referring to FIG. 4, the BS receives an RNG_REQ message containing the MAC address of the MS in step 402 and determines whether a network prefix is known to the BS itself in step 404. If the BS knows the network prefix, the BS goes to step 406. Otherwise, the BS proceeds to step 408.

The BS configures an IP address for the MS using the MAC address of the MS, a CID to be allocated to the MS, and the network prefix in step 406. Meanwhile, not knowing the network prefix, the BS sends a Routing Solicited (RS) message to an access control router (ACR) or a Base Station Controller (BSC) and receives an RA message before completing the authentication procedure for the MS, thereby acquiring the network prefix in step 408 and goes to step 406.

Figure 5:
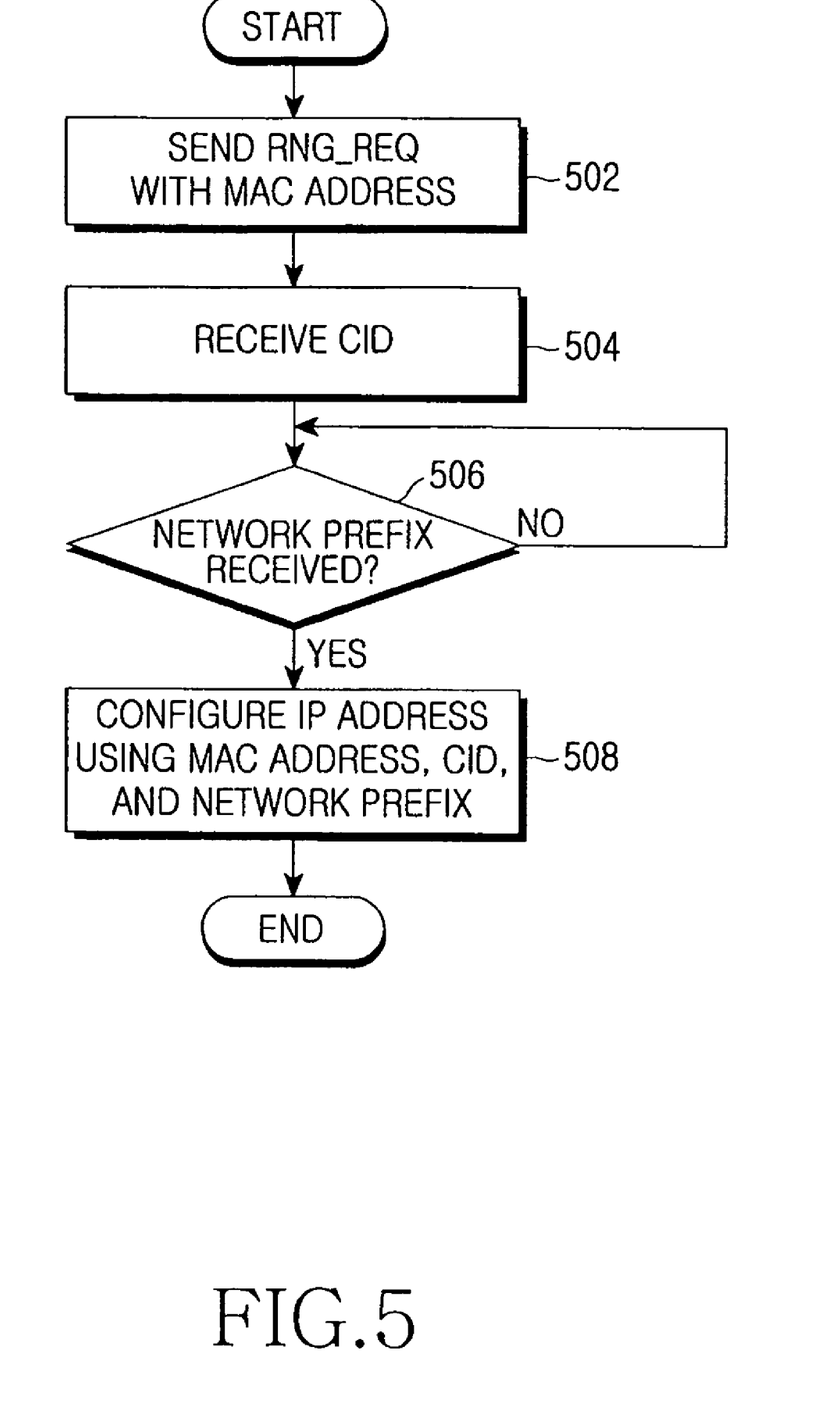
FIG. 5 is a flowchart illustrating an IP address configuration operation in the MS in the wireless mobile communication system having a connection-oriented radio link according to exemplary embodiments of the present invention.

FIG. 5 is a flowchart illustrating an IP address configuration operation in the MS in the wireless mobile communication system having a connection-oriented radio link according to the exemplary embodiments of the present invention.

Referring to FIG. 5, the MS sends an RNG_REQ message containing its MAC address to the BS, for initial network entry or handover in step 502. Hence, the recipient of the RNG_REQ message may be a serving BS for the initial network entry or a target BS for the handover. The MS is allocated a unique CID from the BS in step 504 and monitors reception of an RA message including a network prefix in step

506. Upon receipt of the network prefix, the MS configures an IP address using the MAC address, the CID and the network prefix in step 508.

In accordance with exemplary embodiments of the present invention as described above, an IP address is configured for an MS using a MS-specific CID at a Layer 2 level in a wireless mobile communication system having a connection-oriented radio link. Therefore, a communication interruption time caused by DAD is minimized.

While the invention has been shown and described with reference to certain exemplary embodiments thereof, it will be understood by those skilled in the art that various changes in form and details may be made therein without departing from the spirit and scope of the invention as defined by the appended claims and the full scope of equivalents thereof.

What is claimed is:

1. A method of configuring an Internet Protocol (IPv6) address without Duplicate Address Detection (DAD) in a Mobile Station (MS) in a wireless mobile communication system having a connection-oriented radio link, the method comprising:

allocating a Connection Identifier (CID) specific to an MS from a serving Base Station (BS); and configuring a Care of Address (CoA) IP address using a known network prefix, a Medium Access Control (MAC) address of the MS, and the allocated CID.

2. The method of claim 1, further comprising receiving the CID in a ranging response message from the serving BS.

3. The method of claim 2, wherein the receiving of the CID comprises receiving a basic CID or a primary management CID.

4. The method of claim 1, further comprising receiving the network prefix, included in a routing advertisement message, from the serving BS.

5. A method of receiving a Home of Address (HoA) in a Mobile Station (MS) in a wireless mobile communication system having a connection-oriented radio link, the method comprising:

sending, by the MS, a message including an indicator indicating whether the MS has an HoA to a serving Base Station (BS) selected for initial network entry; and receiving, by the MS, the HoA from the serving BS, if the indication indicates that the MS has no HoA;

wherein a value of the indicator is '0' if the MS has no HoA, and the value of the indicator is '1' if the MS has the HoA.

6. The method of claim 5, further comprising requesting HoA registration to the serving BS, if the indicator indicates that the MS has the HoA.

7. The method of claim 5, wherein the sending of the message comprises sending a ranging request message.

8. A method of configuring an Internet Protocol (IPv6) address without Duplicate Address Detection (DAD) during handover in a Mobile Station (MS) in a wireless mobile communication system having a connection-oriented radio link, the method comprising:

deciding on a handover from an old serving Base Station (BS) to a target BS;

sending a ranging request message including a Medium Access Control (MAC) address of the MS and information indicating the handover to the target BS;

allocating a Connection Identifier (CID) specific to the MS from the target BS;

receiving a routing advertisement message including a network prefix from the target BS; and configuring a Care of Address (CoA) IP address using the network prefix, the MAC address of the MS, and the allocated CID.

9. The method of claim 8, wherein the deciding on the handover comprises deciding on the handover upon request of the serving BS.

10. The method of claim 8, wherein the CoA comprises a 128-bit Internet Protocol version 6 (IPv6) address that is temporarily used when the MS moves from one subnet to another subnet.

11. A method of configuring an Internet Protocol (IPv6) address without Duplicate Address Detection (DAD) in a serving Base Station (BS) in a wireless mobile communication system having a connection-oriented radio link, the method comprising:

receiving a Medium Access Control (MAC) address of a Mobile Station (MS) from the MS; and configuring a Care of Address (CoA) IP address using a network prefix, the MAC address, and a Connection Identifier (CID) allocated to the MS.

12. The method of claim 11, further comprising receiving the MAC address and an indication indicating whether the MS has a Home of Address (HoA) IP address in a ranging request message from the MS.

13. The method of claim 12, further comprising:

requesting allocation of the HoA to an authentication server if the indication indicates that the MS does not have the HoA;

receiving the HoA from the authentication server and registering the HoA and the CoA to an HA on the behalf of the MS through an embedded BU-REQ message; and notifying the MS of the HoA.

14. The method of claim 12, further comprising registering the HoA and the CoA of the MS by sending an BU-REQ message after receiving the HoA, if the indication indicates that the MS has the HoA.

15. The method of claim 11, further comprising sending the HoA to a target BS for handover of the MS, if the serving BS decides on a handover on its own or upon request of the MS.

16. A method of configuring an Internet Protocol (IPv6) address without Duplicate Address Detection (DAD) in a wireless mobile communication system having a connection-oriented radio link, the method comprising:

sending a Medium Access Control (MAC) address of a Mobile Station (MS) to a serving Base Station (BS) by the MS;

configuring, by the serving BS, a Care of Address (CoA) IPv6 address using a network prefix, the MAC address, and a Connection Identifier (CID) allocated to the MS by the serving BS; and configuring, by the MS, upon receipt of the network prefix, the CoA using the network prefix, the MAC address, and the CID.

\* \* \* \* \*